(12) United States Patent
Tsai et al.

(10) Patent No.: US 6,478,571 B1
(45) Date of Patent: Nov. 12, 2002

(54) CLAMPING APPARATUS OF AN INJECTION MOLDING MACHINE

(75) Inventors: Kun-Lung Tsai, Chutung Jen (TW); Jih-Jong Hsu, Chutung Jen (TW); Chih-Hsien Chien, Chutung Jen (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/544,563

(22) Filed: Apr. 6, 2000

(30) Foreign Application Priority Data

Dec. 21, 1999 (TW) ..................................... 088221730 U

(51) Int. Cl.[7] .............................................. B29C 45/64
(52) U.S. Cl. .................................... 425/556; 425/593
(58) Field of Search .............................. 425/556, 593, 425/451.6

(56) References Cited

U.S. PATENT DOCUMENTS

| | | | | |
|---|---|---|---|---|
| 5,190,714 A | * | 3/1993 | Reinhart | 425/593 |
| 5,370,524 A | * | 12/1994 | Liang et al. | 425/593 |
| 5,648,103 A | * | 7/1997 | Takanohashi | 425/593 |
| 5,843,496 A | * | 12/1998 | Ito et al. | 425/593 |
| 6,024,560 A | * | 2/2000 | Ito et al. | 425/593 |
| 6,050,804 A | * | 4/2000 | Tamaki et al. | 425/593 |

* cited by examiner

*Primary Examiner*—James P. Mackey
(74) *Attorney, Agent, or Firm*—Rabin & Berdo, P.C.

(57) ABSTRACT

A clamping apparatus of an injection molding machine includes a servo motor installed at the center of the rear platen and two timing belts to drive two ball screws so as to push a five point inwardly bending toggle mechanism to open the mold, close the mold and mold clamping. Moreover, a servo motor is fixed to the lateral side of the movable platen to drive the nuts of the screw to rotate so as to push the ball screw, ejector rod and ejector plate to move linearly for achieving the object of ejecting. An electromotive motor on the rear platen will drive the mold adjusting means. By the assisting of the servo motor on the rear platen, the function and object of automatic mold adjusting can be achieved rapidly.

5 Claims, 7 Drawing Sheets

CLAMPING APPARATUS OF AN INJECTION MOLDING MACHINE

FIELD OF THE INVENTION

The present invention relates to a clamping apparatus of an injection molding machine, and especially to a mold clamping apparatus for building a clamping force in equilibrium.

DESCRIPTION OF THE PRIOR ART

As shown in FIGS. 1 and 2, a conventional mold clamping apparatus of an injection molding machine is illustrated, which includes a fixed platen A1, a movable platen A2, a rear platen A3, two pairs of parallel tie bar A4 at four corners and an ejector apparatus B. The rear platen A3 and the movable platen A2 are connected by a toggle mechanism A5. By a clamping hydraulic cylinder A6 at the end surface of the rear platen A3 to push a crossed head A7, and then the crossed head A7 to drive the toggle mechanism A5, the actions of opening mold and closing mold are performed. Two guide rods A8 are installed between the rear platen A3, crossed head A7 and the movable platen A2 for guiding the crossed head A7 and supporting the ejector apparatus B. Other than a clamping hydraulic cylinder A6, the end surface of the rear platen A3 is further installed with a set of mold adjusting means including a driven motor A9, a driving gear A10, a gear A11, a female screw gear A11, a female screw supporter A12 and fixed plate A13. By the motor A9 to drive the driving gear A10 for driving the driven gear A11. By the motor A9, the driving gear A10 is driven for further driving the driven gear A11, and then by rotation of the driven gear A11, the female screw gear on the four tie bar A4 are driven so that the rear platen A3 will move with the seat of the movable platen A2. Therefore, the object of mold adjusting is achieved and it can be used by molds with different thickness. The ejector apparatus B includes an ejector plate B1, an ejector hydraulic cylinder B2. By the moving of an ejector piston B4, the ejector rod B3 also move therewith so that the object of separating a product from a mold is attained.

As described above, the conventional mold clamping apparatus of an injection molding machine means uses a hydraulic cylinder means as a power source. Therefore, the hydraulic pump, valves, oil circuits, etc. in the mold clamping apparatus will increment the complexity thereof. The operation of the mold clamping is controlled by hydraulic pressure. Thus, the control is very complex and can not be performed exactly. In order to drive the toggle mechanism means to act, the hydraulic pump must be operated continuously for generating a required hydraulic pressure. Moreover, in order to retain a required pressure, a large energy must be consumed. Besides, conventional mold clamping apparatus of an injection molding machine has a problem of oil pollution which is undesired by peoples.

SUMMARY OF THE INVENTION

Accordingly, the primary object of the present invention is to provide a mold clamping apparatus for effectively improving the defects in the conventional injection molding machine, such as large power consuming, difficult in maintenance and positioning for substituting the conventional hydraulic power source. Therefore, the structure can be simplified and positioning precision is incremented so that power is saved and oil pollution is avoided.

Another object of the present invention is to provide the mold clamping apparatus of an injection molding mechanism. Other than improving the aforesaid defects of conventional mold clamping apparatus, since two timing belts are used instead of single belt as in the prior art design. Since two symmetric ball screw with two timing belts are used instead of two belts, the unbalance of tension and the timing difference from the driving of ball screw are avoided. Moreover, since symmetric ball screw are used, the mold clamping forces are built. Therefore, the precision and stability of products are improved.

Accordingly, the present invention provides a mold clamping apparatus for an injection molding machine means mainly includes a servo motor installed at the center of the rear platen and two timing belts to drive two ball screw rear platen so as to push a five point inward bending toggle mechanism to open mold, close mold and clamping mold. Moreover, the servo motor fixed to the lateral side of the movable platen drives the nuts to rotate so as to push the ball screw, ejector rod and ejector plate to move linearly for achieving the object of ejecting. A electromotive motor on the rear platen will drive the mold adjusting means. By the assisting of the servo motor on the rear platen, the function and object of automatic mold adjusting can be achieved rapidly.

BRIEF DESCRIPTION OF THE DRAWINGS

The drawings disclose a illustrative embodiment of the present invention which serves to exemplify the various advantages and objects hereof, and are as follows.

DETAILED DESCRIPTION OF THE PREFERRED EMBODIMENT

The primary feature of the present invention is to provide a mold clamping method and apparatus. By a selectably and bidirectionally rotationable first servo motor on the rear platen and double ball screw, a conventional clamping hydraulic cylinder is replaced. Moreover, by a selectably and bidirectionally rotationable second servo motor and ball screw on the movable platen, the prior art ejector hydraulic cylinder is substituted. Furthermore, by the inducing motor at the rear platen, the mold can be adjusted rapidly. Therefore, an all electric mold clamping apparatus is achieved.

Figure 1:
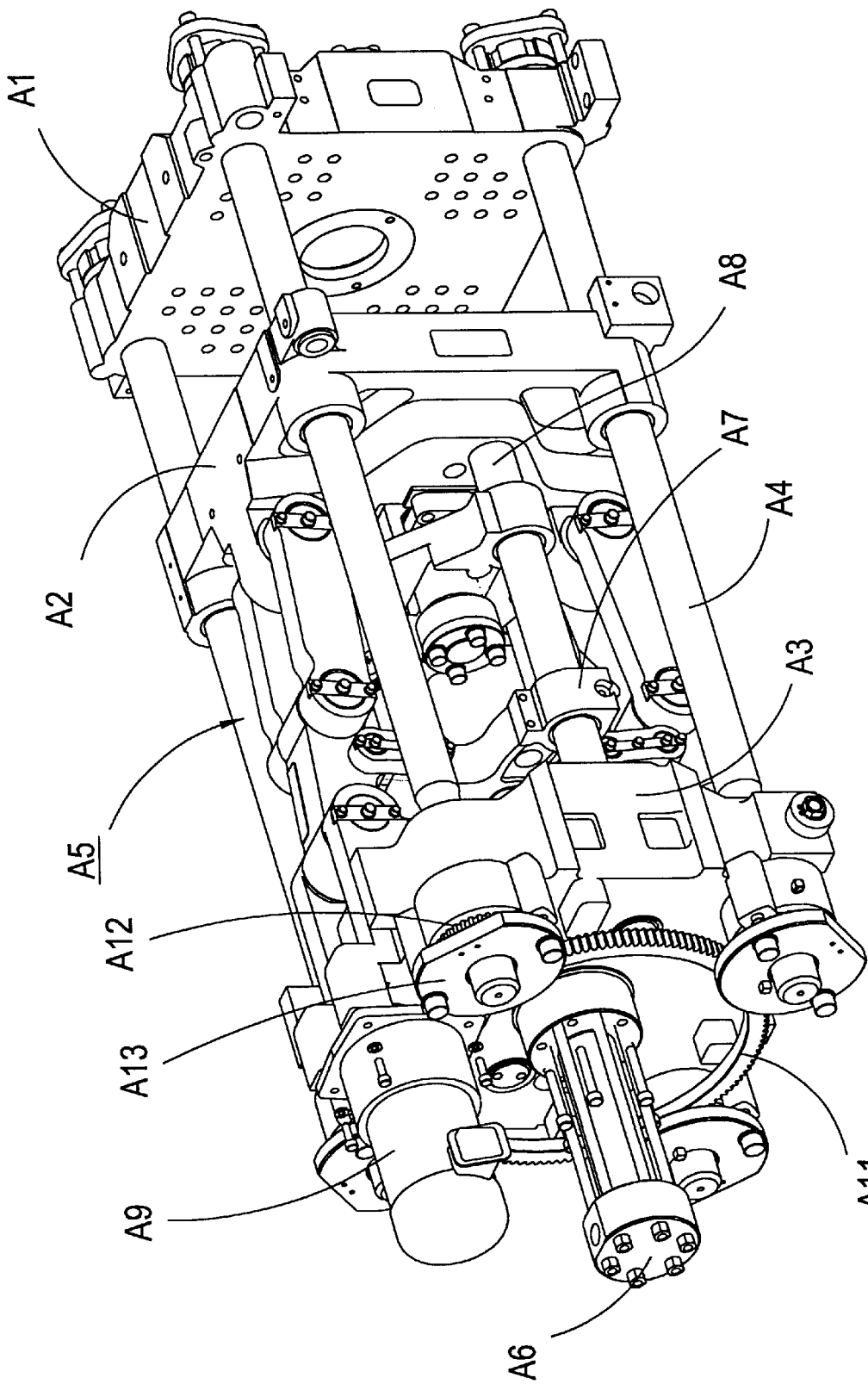
FIG. 1 is a perspective view of a conventional mold clamping apparatus for an injection molding machine.
Figure 2:
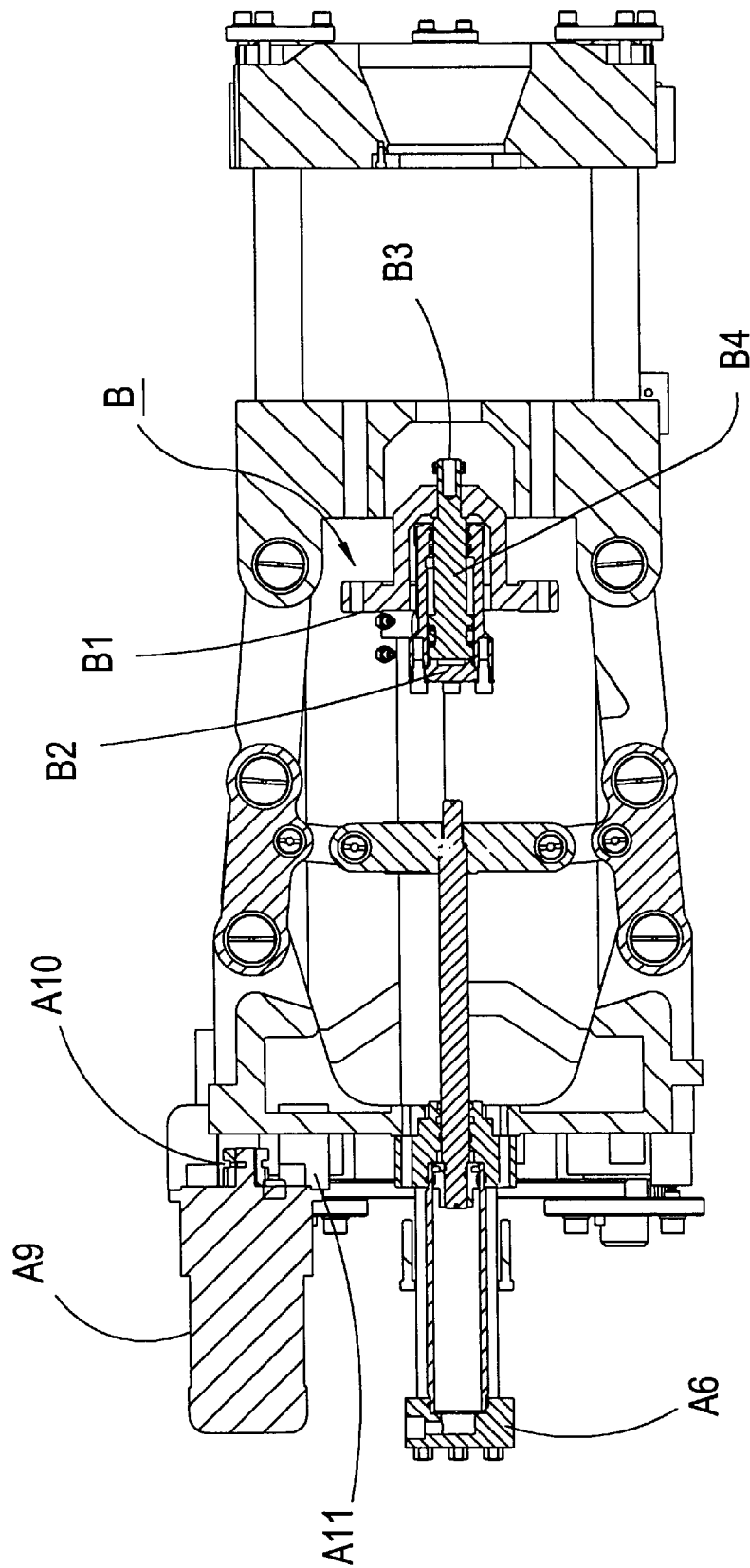
FIG. 2 is a cross sectional view of a conventional mold clamping apparatus for an injection molding machine.
Figure 3:
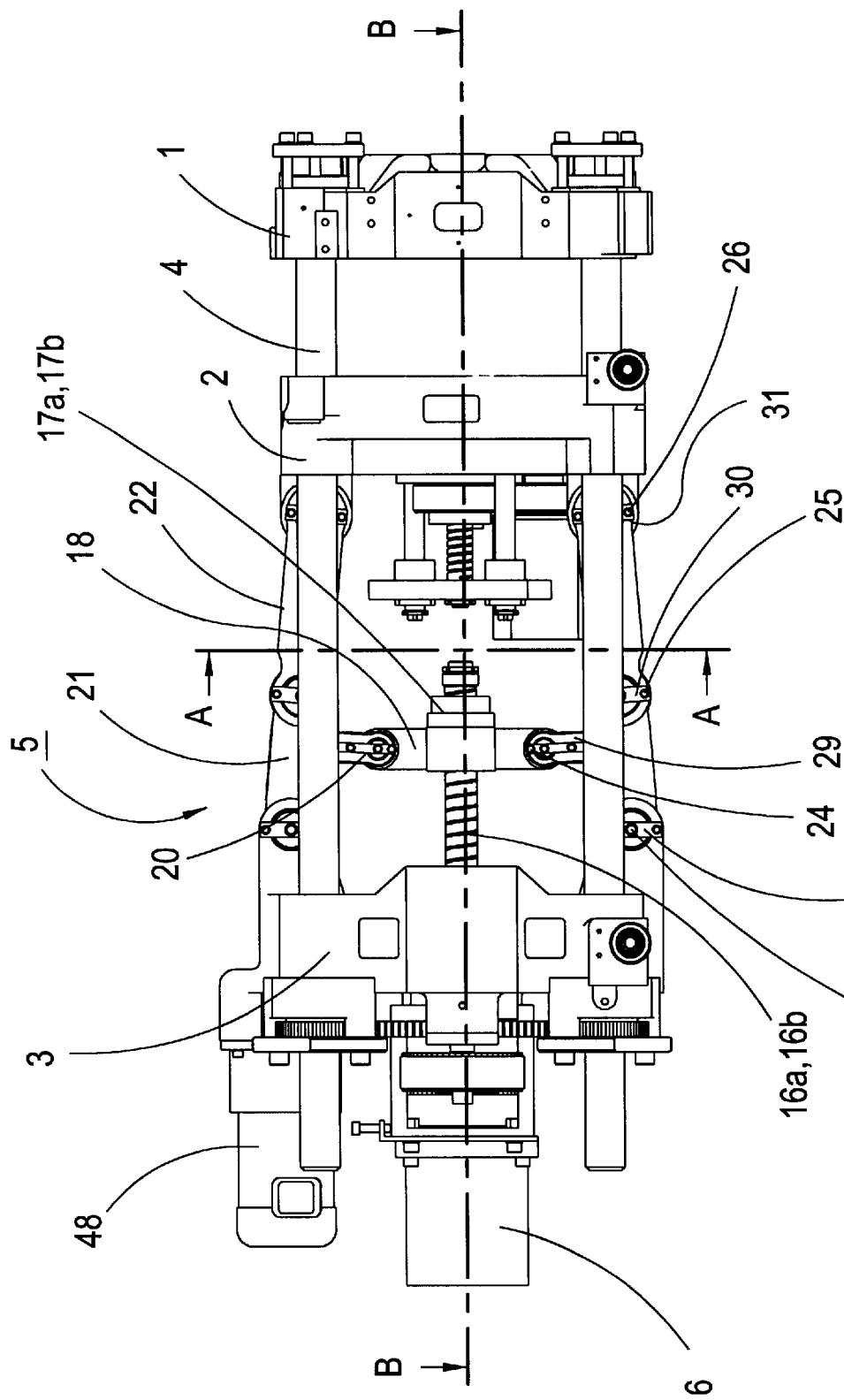
FIG. 3 is a front view of the mold clamping apparatus according to the present invention.
Figure 4:
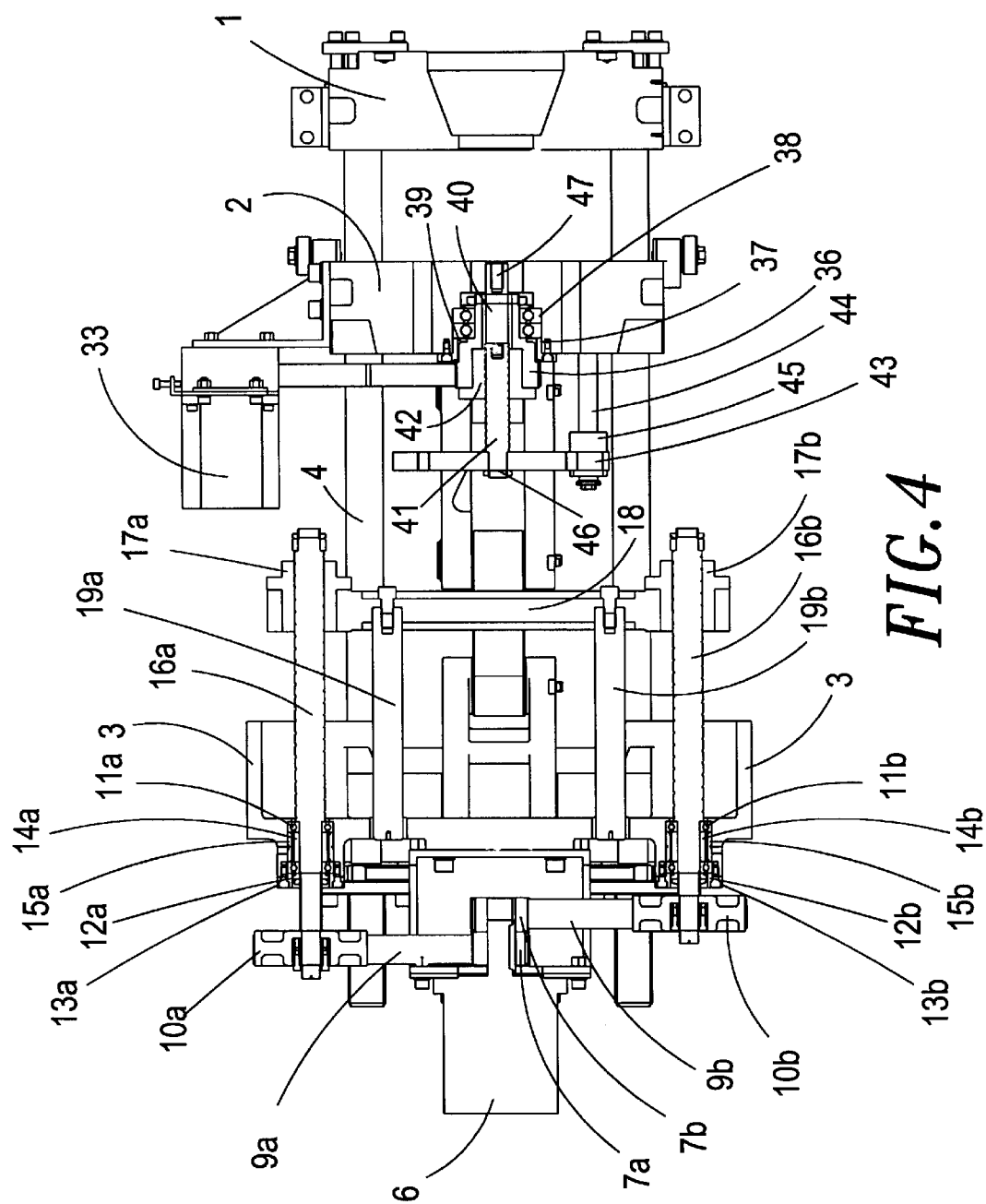
FIG. 4 is a cross sectional view along the line B~B of FIG. 3.

With reference to FIGS. 3 and 4, the mold clamping apparatus of the present invention includes a fixed platen 1, a movable platen 2, a rear platen 3, and a plurality of tie bars 4 for spacing and connecting the fixed platen 1, the movable platen 2 and the rear platen 3. An inwards bending toggle mechanism 5 serves to connect the rear platen 3 and the movable platen 2. By the transmission of the first and second driving wheels 7a and 7b on the first servo motor 6, first and second timing belt 9a and 9b, and first and second driven wheels 10a and 10b. The first and second ball screw 16a and 16b supported by bearings 11a and 11b, inner bearing fixed rings 12a and 12b, outer bearing fixed rings 13a and 13b, inner spacer 14a and 14b, outer spacer 15a and 15b are driving to rotate so that the Nuts 17a and 17b on the first and second ball screw 16a and 16b are moved linearly along the first and second ball screw 16a and 16b. Thus, the inner bending toggle mechanism 5 may close or open a mold. In the present invention, since a first servo motor 6 serves to replace a hydraulic cylinder as a power source. Through the deceleration of the first and second driving wheels 7a and 7b and the first and transmission of the second timing belts 9a and 9b, the transmission means of the first and second guide screw rods 16a and 16b and nuts 17a and 17b are driven. Moreover, symmetric first and second guide rods 19a and 19b serves to connect the rear platen 3 and the crosshead 18 for increasing the stability for closing and opening mold so that the crosshead 18 can be guided. Therefore, the transmission of the double timing belts 9a and 9b used in the present invention can easily cancel the timing difference in transmitting of the double ball screw. Moreover, since the two guide rods 19a and 19b can confine the transmission error between the two ball screw 16a and 16b and reduce the impact as mold is closed and opened in order to position the precision. Moreover, since no oil pressure system, no oil pollution will occur. Furthermore, since the device is very simple, the assembly and maintenance are easy.

The way for adjusting the tension of the timing belts 9a and 9b in the present invention is performed by a device vertically moved to drive a first servo motor 6 (for example, a pneumatic cylinder, etc) for achieving the function of adjusting the tension of the timing belts 9a and 9b. Moreover, for the initial adjustment of the crosshead 18 and the nuts 17a and 17b, the fixed screw between the crosshead 18 and one of the nuts 17a and 17b can be released. Then, the timing belts 9a and 9b are driven manually so that the movable platen 2 is pressed tightly to the place for locating the mold (not shown). Then, the orientations of the position thereof and the toggle-mechanism are identical. Then, the nuts 17a and 17b are fixed to the crosshead 18, and thus the process is complete.

With reference to FIG. 3, the five point inwards bending toggle mechanism means 5 is formed by a idler link 20 connected to the crosshead 18, a first link 21 fixed to the rear platen 3, a second link 22 connected to the movable platen 2, axial pins 23, 24, 25, 26 and 27, and fixed plates 28, 29, 30 and 31. The toggle mechanism means 5 can be moved quickly, and the travel length necessary to be input is short, this is beneficial to the location of other elements. When the first and second ball screw 16a and 16b rotates to drive the nuts 17a and 17b to move linearly. The crosshead 18 on the nuts 17a and 17b are also driven so as to move linearly and reciprocally to drive the toggle mechanism means 5 to further drive the movable platen 2, thus, achieving the object of fast closing and opening mold. When plastic is injected, by the inverse rotation of the first servo motor 6 and the transmission of the transport-mechanism, the first and second ball screw 16a and 16b are driven to rotate inversely so as to drive the nuts 17a and 17b to move linearly in a inverse direction and thus to drive the crosshead 18 to move inversely to open the mold.

In the present invention, the two ball screw device 16a and 16b serve to drive the five points inwards bending toggle mechanism 5 for reducing the loading of the single ball screw so that the ball screw 16a and 16b can be used conveniently and commonly. Moreover, the ball screw 16a and 16b have a precision of grinding level and matched with the nuts 17a and 17b previously pressed. Therefore, the backlash of the ball screw can be avoided. The symmetrical crosshead 18 is formed integrally with a high rigidity and precision for being connected to the nuts 17a and 17b of ball screw and the guide rods 19a and 19b for pushing the toggle mechanism means in equilibrium. When it is desired to built a clamping force, since the crossed head 18 is pushed in equilibrium, the clamping force can be build in equilibrium. Furthermore, in order that no time difference occurs as the first and second ball screw 16a and 16b are driven, the first and second timing belts 9a and 9b are used to driven synchronously, so as to have matched driving tensions. This can not be achieved by the prior art single belt driving. Besides, the prior art belt can achieve the object of synchronous driving. Thus, in the prior art, a balance device means must be extra mounted to the crossed head. Or in order to avoid the problem of interruption, a plurality of idle wheels are necessary to be installed to the rear platen. Thus, the prior art design is very complex, not easy to be maintained, and low efficient, and has a increase cost. Moreover, due to the draining of high pressure oil, the oil pollution possibly occurs.

Moreover, in order that the two ball screw 16a and 16b can be operated smoothly and equilibrium, a set of symmetric guide rods 19a and 19b are installed between the crosshead 18 and the rear platen. Another end is placed against the rear platen 3 so as to move reciprocally with the closing and opening of the crosshead 18.

Figure 5:
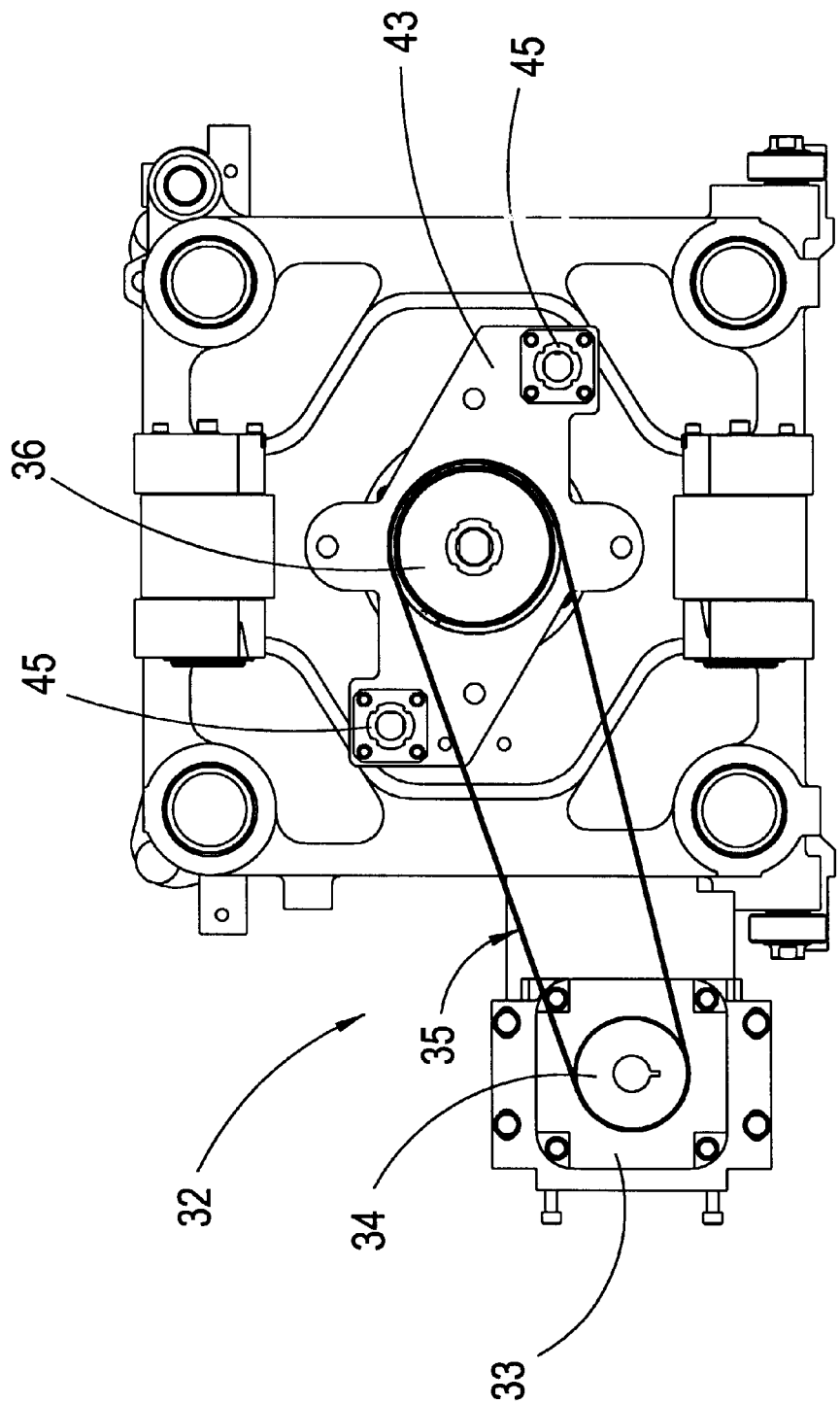
FIG. 5 is a cross sectional view along the line A~A of FIG. 3.

Referring to FIGS. 4 and 5, the ejector apparatus 32 of the present invention is place in a finite space between the toggle mechanism means 5 and the movable platen 2. The ejector apparatus 32 is formed by a second servo motor 33, a driving wheel 34, a third timing belt 35, a passive wheel seat 36, a outer bearing fixed ring 37, a bearing 38, a inner bearing fixed ring 39, a locking nut 40, a third ball screw 41, a nut 42, an ejector plate 43, a third guide rod 44, a linear bush 45, a locking nut 46, an ejector 47. In operation, the bearing 38 is installed in the passive wheel seat 36 and is fixed by the inner bearing fixed ring 39 and locking nut 40. Then, the passive wheel seat 36 is fixed to the guide screw rod nut 42 by screws. Then, the whole structure is fixed to the corresponding hole of the movable platen 2. Then it is further fixed to the movable platen 2 by screws. The ejector plate 43 is installed on the third guide rod 44 and is fixed to the end portion of third ball screw 41. As the second servo motor 33 rotates in a reverse direction, it will move back. Other then avoiding oil pollution to achieve the object of fast ejecting and retraction, in the ejector apparatus 32 of the present invention, in order to reduce the friction force of the ejector plate 43 and the third guide rod 44, a linear bush 45 can be used on the ejector plate 43 for mounting the third guide rod 44. Besides, the hollow inner space of the third ball screw 41 serves to install the ejector rod 47 by the end of the third ball screw 41.

Figure 6:
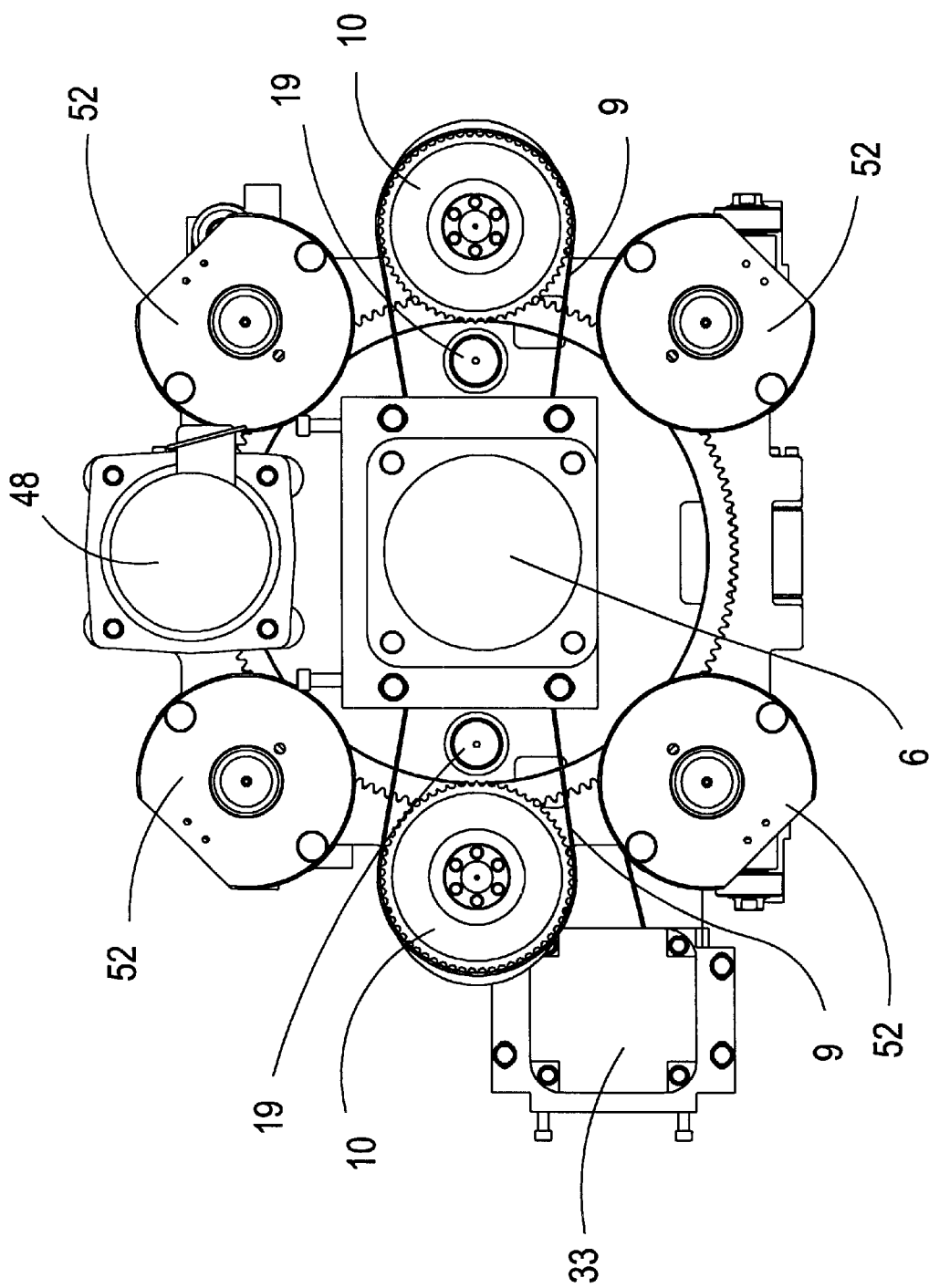
FIG. 6 is a lateral view of the mold adjusting device of the present invention.
Figure 7:
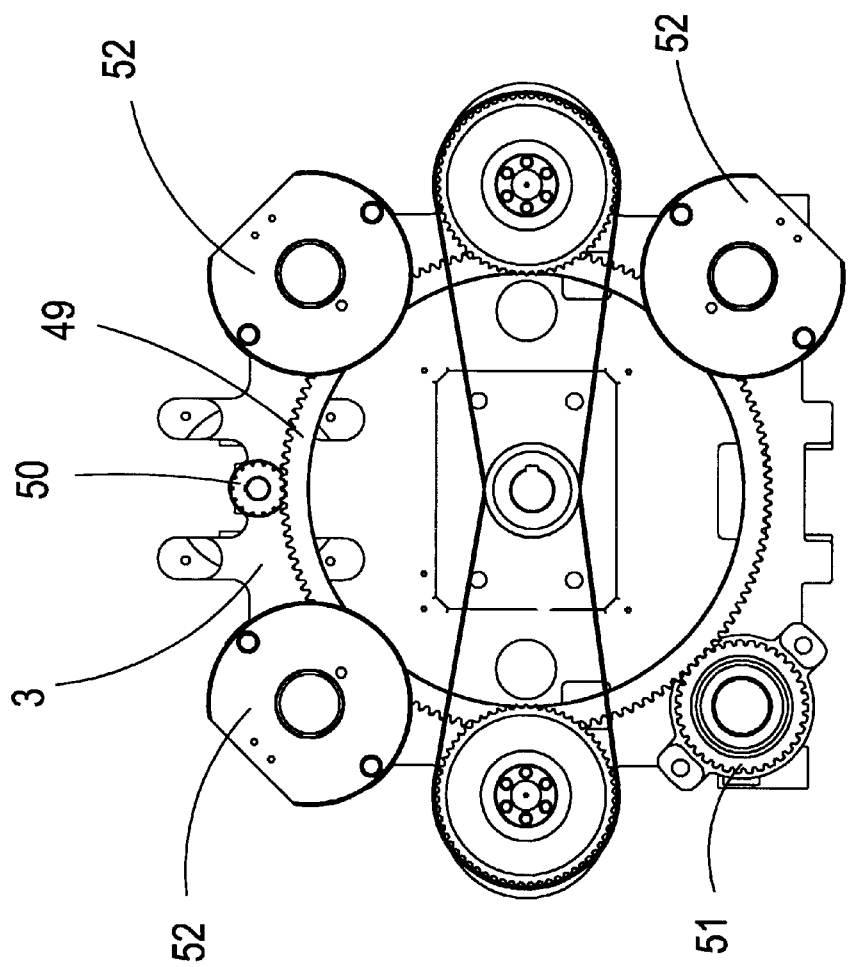
FIG. 7 is a schematic view of the mold adjusting device of the present invention.

Referring to FIGS. 6 and 7, in the present invention, a mold adjusting means is placed at the end surface of the rear platen 3, which includes a inducing motor 48, a mold adjusting driven gear 40, a driving gear 50, a plurality of female screw gears 51 and the fixed plate 52 thereof. When the driving gear 50 rotates, the mold adjusting driven gear 49 then drives a plurality of female screw gear 51 synchronously for pushing the mold clamping apparatus means to move forwards. When the driven gear 50 rotates inversely. Similarly, a plurality of fixed plates 52 are pushed, then the fixed plate 52 on the rear platen 3 pulls the mold clamping apparatus means backwards for achieving the object of mold adjusting.

Therefore, the mold clamping mechanism and the ejector mechanism of the mold clamping apparatus can achieve the requirement of high efficiency, high precision, and environment protection.

The mold clamping apparatus of the present invention has the following advantages as comparing with the prior art designs:

1) A servo motor is used as a power source, and two parallel timing belts serve to drive the symmetric two ball screw means synchronously for driving a inner bending articulated toggle mechanism to open or close a mold so as to avoid a driving time difference occurs due to a overlong belts. Moreover, a equilibrium clamping force is built. Moreover, the load of reducing guide screw rod is reduced and the common using of the ball screw is increased.

2) One end of each ball screw is fixed, while another end is free, therefore, a slight bending of the toggle mechanism can be absorbed. While the guide rod between the crossed head and the rear platen will balance the forces of the two ball screw so that they can operate smoothly and the impact as the mold is closed or opened is reduced.

3) The ejector mechanism means uses a servo motor as a driving means. Nuts are rotates through a transmission means. The ball screw rods and ejector rod are driven by the guide screw rods to move linearly so that the ejecting and withdrawing actions are completed. While a linear bush is used between the guide rods and the ejector plate for reducing the friction force between the guide rods and the ejector plate.

4) The structure of the mold clamping apparatus of an injection mold machine is simplified and precision is incremented. Power is saved and no oil pollution is formed.

What is claimed is:

1. A clamping apparatus of an injection molding machine, comprising:
   a fixed platen;
   a movable platen installed below the fixed platen;
   a rear platen installed below the movable platen;
   a plurality of parallel tie bars for spacing and connecting the fixed platen, the movable platen, and the rear platen;
   a first servo motor fixed to the rear platen and being selectable to rotate bidirectionally;
   first and second ball screws;
   a first and a second timing belt, each being coupled to and driven by the first servo motor, the first timing belt driving the first ball screw, and the second timing belt driving the second ball screw, at least one of the first timing belt and the second timing belt being separately adjustable so that the first and second ball screws rotate synchronously; and
   an inwardly bending toggle mechanism coupled to the first and second ball screws and being coupled to the movable platen, the first and second ball screws driving the toggle mechanism to move the movable platen linearly and reciprocally, thus, the actions of opening mold, closing mold and mold clamping being completed.

2. The clamping apparatus of an injection molding machine as claimed in claim 1, further comprising a crosshead coupling said first and second ball screws to the toggle mechanism, wherein the first and second ball screws drive the crosshead to move linearly and reciprocally, and the crosshead drives the toggle mechanism.

3. The clamping apparatus of an injection molding machine as claimed in claim 2, further comprising symmetric first and second guide rods that connect the crosshead and the rear platen.

4. The clamping apparatus of an injection molding machine as claimed in claim 1, further comprising an ejector apparatus installed between the inwardly bending toggle mechanism and the movable platen, said ejector apparatus including a selectable and bidirectional rotational second servo motor connected to the movable platen, a third ball screw having an ejector rod disposed therein, a pin ejector plate fixed to an end of the third ball screw, and a third guide rod having the pin ejector plate mounted thereon, the third ball screw and the ejector rod being driven by the second servo motor to move linearly.

5. The clamping apparatus of an injection molding machine as claimed in claim 4, wherein the ejector apparatus further comprises a linear bush on the ejector plate for reducing friction between the ejector plate and the third guide rod.

* * * * *